US007736028B2

(12) United States Patent
Shimaoka

(10) Patent No.: US 7,736,028 B2
(45) Date of Patent: Jun. 15, 2010

(54) LIGHT SOURCE APPARATUS, LIGHTING APPARATUS AND PROJECTION DISPLAY APPARATUS

(75) Inventor: Yusaku Shimaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/547,453

(22) PCT Filed: Jul. 14, 2004

(86) PCT No.: PCT/JP2004/010353

§ 371 (c)(1), (2), (4) Date: Aug. 29, 2005

(87) PCT Pub. No.: WO2005/008329

PCT Pub. Date: Jan. 27, 2005

(65) Prior Publication Data

US 2006/0171150 A1 Aug. 3, 2006

(30) Foreign Application Priority Data

Jul. 16, 2003 (JP) ............................ 2003-275335

(51) Int. Cl.
*F21V 7/00* (2006.01)

(52) U.S. Cl. ............ 362/304; 362/296.01; 362/296.06; 362/346; 362/517; 362/518; 353/98; 353/99; 353/102; 359/443; 359/448; 359/449

(58) Field of Classification Search ................. 362/261, 362/296, 296.01, 296.06–296.09, 297, 298, 362/302, 304, 305, 341, 346, 347, 514, 516–518; 353/30, 37, 98, 99, 102; 359/443–461
See application file for complete search history.

(56) References Cited

U.S. PATENT DOCUMENTS 1,460,501 A * 7/1923 Ritter ......................... 362/268
1,463,623 A * 7/1923 McCarthy .................. 362/302

(Continued)

FOREIGN PATENT DOCUMENTS

JP 6-289394 A 10/1994

(Continued)

OTHER PUBLICATIONS

International Search Report for PCT/JP2004/010353, with English language translation, dated Sep. 14, 2004.

*Primary Examiner*—Sandra L O'Shea
*Assistant Examiner*—Mary Zettl
(74) *Attorney, Agent, or Firm*—RatnerPrestia

(57) ABSTRACT

A light source apparatus comprising a lamp having a light emitting portion of generating light, a first concave mirror having a first opening provided on a light-using side on which the generated light is used and a second opening provided on an opposite side to the light-using side and having the light emitting portion of the lamp placed inside, and a second concave mirror having a predetermined size to reflect on the light emitting portion side of the lamp the light which comes or should come out of the second opening and placed at a predetermined position in relation to a position at which the second opening is provided, and wherein the size of the second opening is provided so that an amount of the used light becomes substantially maximum.

15 Claims, 16 Drawing Sheets

M41
θ
A41
V40
F41
L40
F42
A42
M42

U.S. PATENT DOCUMENTS

| | | | | |
|---|---|---|---|---|
| 1,530,621 | A * | 3/1925 | Ritter | 362/309 |
| 1,699,108 | A * | 1/1929 | Halvorson, Jr. | 353/97 |
| 3,318,184 | A * | 5/1967 | Jackson | 353/99 |
| 4,305,099 | A | 12/1981 | True et al. | |
| 4,654,758 | A * | 3/1987 | Szekacs | 362/516 |
| 4,956,759 | A | 9/1990 | Goldenberg et al. | |
| 5,622,418 | A * | 4/1997 | Daijogo et al. | 353/97 |
| 5,844,638 | A * | 12/1998 | Ooi et al. | 349/10 |
| 6,007,223 | A * | 12/1999 | Futami | 362/517 |
| 6,129,447 | A * | 10/2000 | Futami | 362/522 |
| 6,488,379 | B2 * | 12/2002 | Kane | 353/94 |

FOREIGN PATENT DOCUMENTS

| | | | |
|---|---|---|---|
| JP | 7-107596 | B2 | 11/1995 |
| JP | 9-120067 | A | 5/1997 |
| JP | 2730782 | B2 | 12/1997 |
| JP | 10-171020 | A | 6/1998 |
| JP | 11-162219 | A | 6/1999 |
| JP | 11-327047 | A | 11/1999 |
| JP | 2001-27781 | A | 1/2001 |
| JP | 3151734 | B2 | 1/2001 |
| JP | 2002-367417 | A | 12/2002 |

* cited by examiner

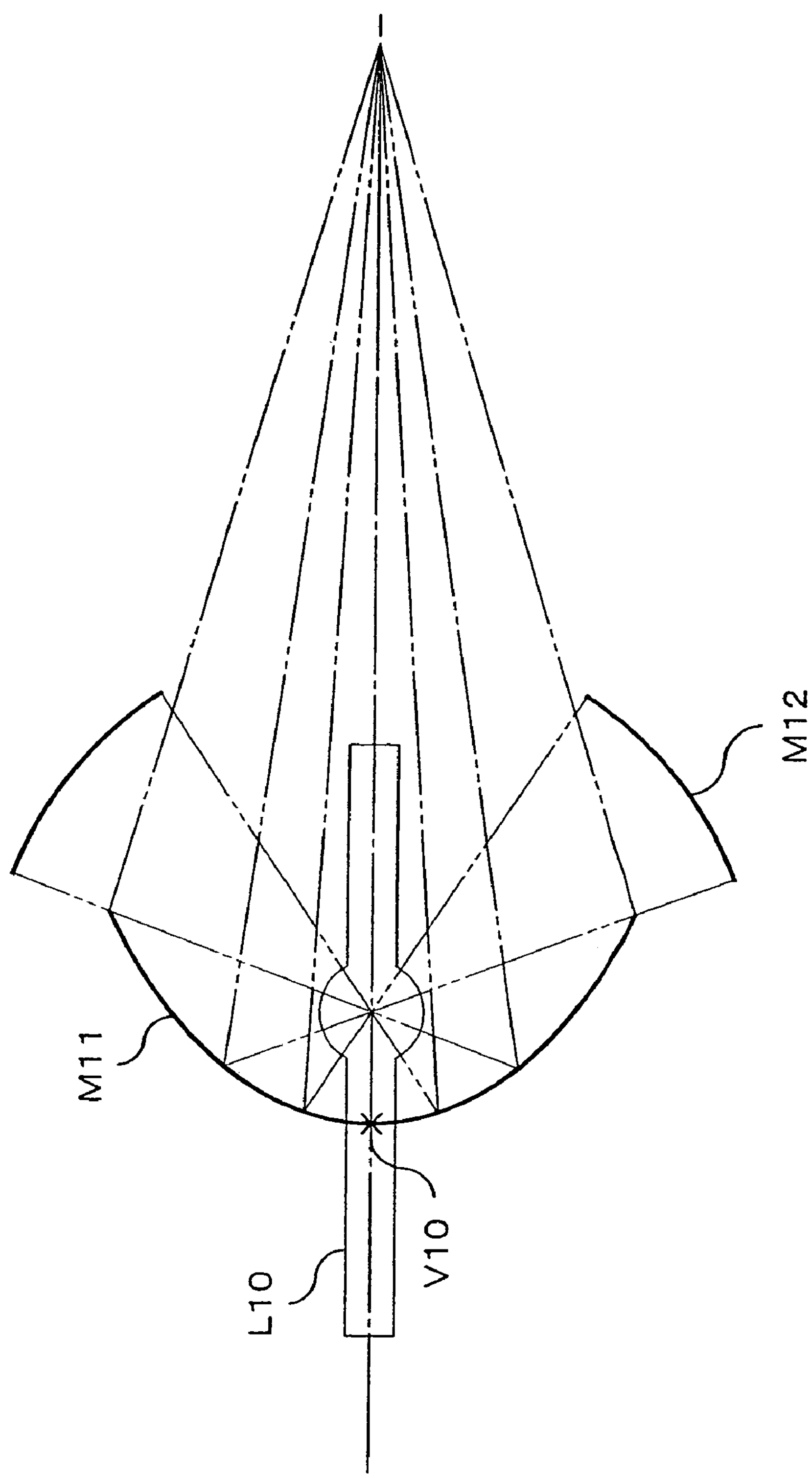
Fig. 14 PRIOR ART

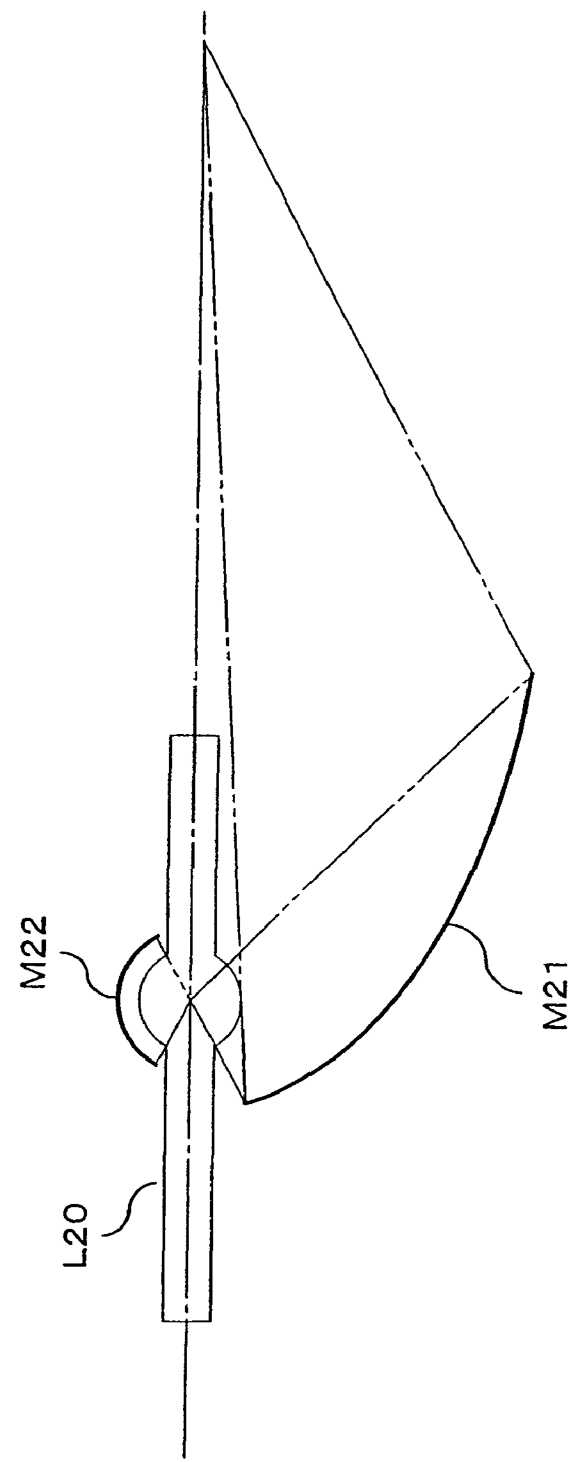
Fig. 15 PRIOR ART

Fig. 16 PRIOR ART
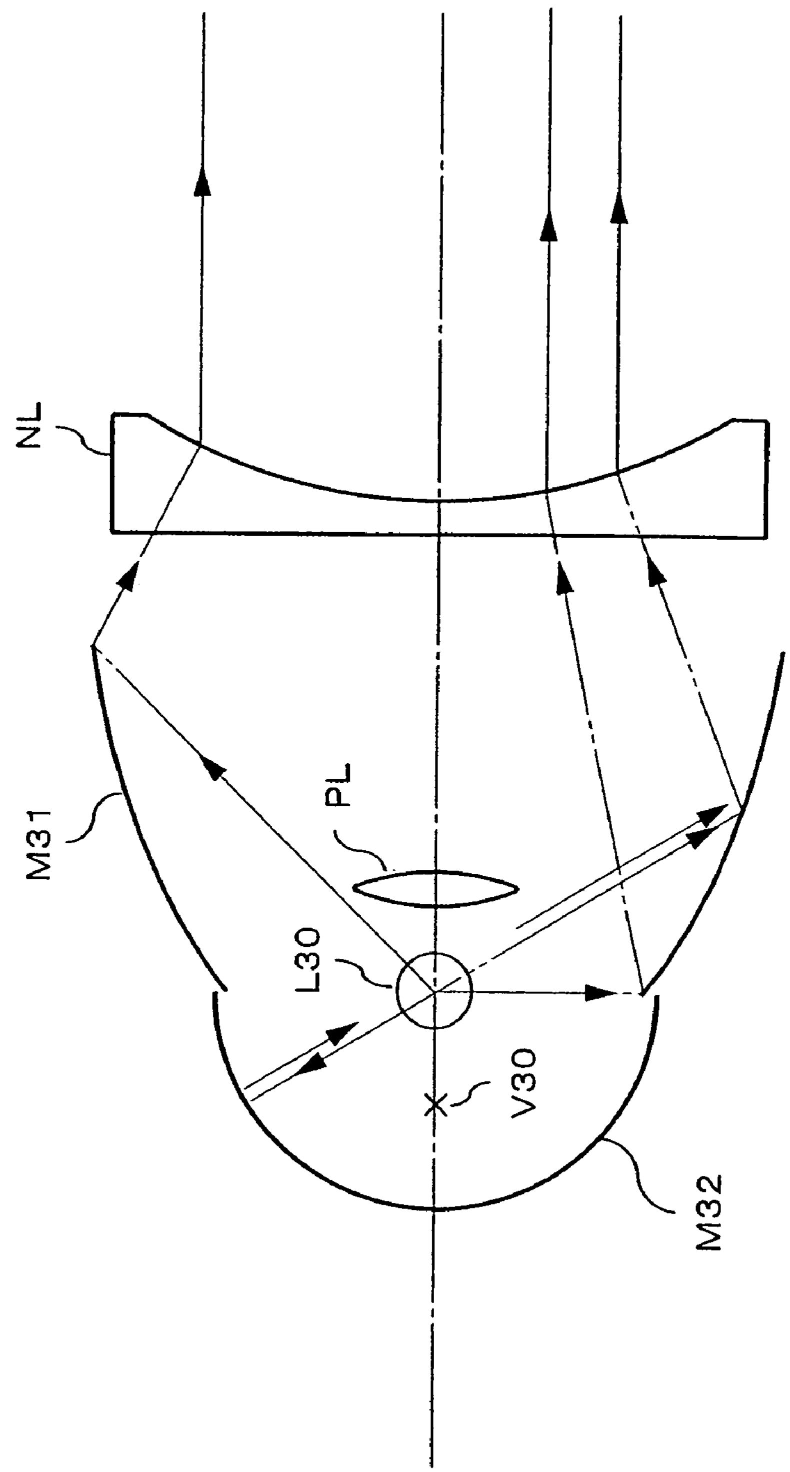

LIGHT SOURCE APPARATUS, LIGHTING APPARATUS AND PROJECTION DISPLAY APPARATUS

THIS APPLICATION IS A U.S. NATIONAL PHASE APPLICATION OF PCT INTERNATIONAL APPLICATION PCT/JP2004/010353.

TECHNICAL FIELD

The present invention relates to a light source apparatus, a lighting apparatus and a projection display apparatus of projecting an image onto a screen.

BACKGROUND ART

In recent years, a projection display apparatus using various light modulation elements has attracted attention as a projection video apparatus of providing large-screen display.

In the large-screen display provided by using the projection display apparatus, it is required to secure sufficient brightness of an image determined by luminance of a lamp, optical collection efficiency of a concave mirror, lighting efficiency of a lighting lens system, optical usable efficiency of the light modulation elements and so on.

Here, conventional light source apparatuses will be specifically described.

(1) To begin with, configuration and operation of a conventional light source apparatus (1) will be described with reference to FIG. 14 which is a schematic sectional view thereof (refer to the specification of Japanese Patent No. 3151734 for instance).

The disclosure of the specification of Japanese Patent No. 3151734 is incorporated herein by reference in its entirety.

The conventional light source apparatus (1) comprises a first concave mirror M11 formed using an ellipsoidal mirror (or a parabolic mirror) and a second concave mirror M12 formed using a spherical mirror.

The first concave mirror M11 and second concave mirror M12 are placed so that their apertures face each other and their focuses are approximately matching.

Of course, a light emitting portion of a lamp L10 is placed at positions of these focuses.

The conventional light source apparatus (1) has the second concave mirror M12 placed on a different side from a vertex V10 of the first concave mirror M11 with respect to the light emitting portion of the lamp L10.

On the conventional light source apparatus (1), the aperture of the second concave mirror M12 is perpendicular to an optical axis (shown in dashed line, same hereafter), and an outermost diameter perpendicular to the optical axis of the second concave mirror M12 is larger than the outermost diameter of the first concave mirror M11.

Luminous flux (shown in chain double-dashed line, same hereafter) emitted from the light emitting portion of the lamp L10 is focused by the first concave mirror M11.

However, the luminous flux which could not be directly focused just by the first concave mirror M11 is reflected once on the second concave mirror M12 of which reflecting surface is facing the reflecting surface side of the first concave mirror M11 and returned again to the vicinity of the light emitting portion of the lamp L10 before focused by the first concave mirror M11.

For this reason, the conventional light source apparatus (1) can focus the luminous flux which could not be focused just by the first concave mirror M11 by using the second concave mirror M12 so as to improve the optical collection efficiency which is important for the sake of maximizing the luminance of the lamp L10.

(2) Next, the configuration and operation of a conventional light source apparatus (2) will be described with reference to FIG. 15 which is a schematic sectional view thereof (refer to the specification of Japanese Patent No. 2730782 and Japanese Patent Laid-Open No. 11-162219 for instance).

The disclosure of the specification of Japanese Patent No. 2730782 and Japanese Patent Laid-Open No. 11-162219 is incorporated herein by reference in its entirety.

On the conventional light source apparatus (2), the luminous flux which could not be directly focused just by the first concave mirror M21 is reflected once on the second concave mirror M22 and returned again to the vicinity of the light emitting portion of the lamp L20 before focused by the first concave mirror M21.

On the conventional light source apparatus (2), however, the aperture of the second concave mirror M22 is parallel to the optical axis, and the outermost diameter perpendicular to the optical axis of the second concave mirror M22 is smaller than the outermost diameter of the first concave mirror M21.

For this reason, the conventional light source apparatus (2) can have a smaller apparatus configuration than that of the above-mentioned conventional light source apparatus (1).

(3) Next, the configuration and operation of a conventional light source apparatus (3) will be described with reference to FIG. 16 which is a schematic sectional view thereof (refer to the specification of U.S. Pat. No. 4,305,099, Japanese Patent Publication No. 7-107596 and Japanese Patent Laid-Open No. 2002-367417 for instance).

The disclosure of the specification of U.S. Pat. No. 4,305,099, Japanese Patent Publication No. 7-107596 and Japanese Patent Laid-Open No. 2002-367417 is incorporated herein by reference in its entirety.

On the conventional light source apparatus (3), the luminous flux which could not be directly focused just by the first concave mirror M31 is reflected once on the second concave mirror M32 and returned again to the vicinity of the light emitting portion of the lamp L30 before focused by the first concave mirror M31.

However, the conventional light source apparatus (3) has the second concave mirror M32 placed, with respect to the light emitting portion of the lamp L30, on the same side as a (virtual) vertex V30 of the first concave mirror M31 and farther from the light emitting portion of the lamp L30.

The conventional light source apparatus (3) has the lamp L30 placed so that a longitudinal direction of electrodes of the lamp L30 becomes orthogonal to an optical axis direction.

For this reason, the conventional light source apparatus (3) comprises a parallel light converting portion having a positive lens (convex lens) PL and a negative lens (concave lens) NL to use the luminous flux in the optical axis direction more effectively.

(1) In the above-mentioned conventional light source apparatus (1), there are the cases where it has a negative effect of extending a spot diameter of an optical spot formed on a focusing point as regards the luminous flux emitted from the light emitting portion of the lamp L10 and reflected on a point of reflection in the vicinity of the vertex V10 of the first concave mirror M11.

Analysis by the Inventors

According to an analysis by the inventors, this is because the light emitting portion of the lamp L10 is not a point source but is a light source having a size, and regarding the luminous flux reflected on the point of reflection in the vicinity of the vertex V10 of the first concave mirror M11, an optical path distance from the light emitting portion of the lamp L10 to the point of reflection thereof becomes significantly shorter than the optical path distance from the point of reflection to the focusing point.

(2) For the same reason, there are also the cases where the above-mentioned conventional light source apparatus (2) has the negative effect of extending the spot diameter of the optical spot formed on the focusing point as to the above-mentioned luminous flux.

(3) The above-mentioned conventional light source apparatus (3) seldom has such a negative effect.

According to the analysis by the inventors, this is because the optical path distance from the light emitting portion of the lamp L30 to the point of reflection thereof does not become too short compared to the optical path distance from the point of reflection to the focusing point (as the second concave mirror M32 is placed, with respect to the light emitting portion of the lamp L30, on the same side as the vertex V30 of the first concave mirror M31 and farther from the light emitting portion of the lamp L30, an optical path going through the point of reflection of the second concave mirror M32 is generated as to the luminous flux which should originally be reflected on the point of reflection in the vicinity of the vertex V30 of the first concave mirror so as to extend the optical path distance from the light emitting portion of the lamp L30 to the point of reflection of the first concave mirror M31).

However, the inventors noted that there are the cases where the above-mentioned conventional light source apparatus (3) cannot obtain a sufficient usable amount of light of the light passing through the aperture of the first concave mirror M31.

The inventors analyze the reason as follows.

To be more specific, in the case of the above-mentioned conventional light source apparatus (3), the luminous flux which should originally be reflected on the point of reflection rather far from the vertex V30 of the first concave mirror M31 near the light emitting portion of the lamp L30 is reflected once on the second concave mirror M32 and returned to the vicinity of the light emitting portion of the lamp L30 again before focused by the first concave mirror M31.

When reflected once on the second concave mirror M32, efficiency of the luminous flux is reduced due to a reflectance of the reflecting surface thereof.

The efficiency of the luminous flux is also reduced due to light absorption and light scattering by a light-emitting material of the lamp L30 and a material comprising the lamp L30 when returned to the vicinity of the light emitting portion of the lamp L30. In the case where the lamp L30 is a metal halide lamp or a mercury lamp, the efficiency of the luminous flux is reduced by as much as 60 percent or so when returned to the vicinity of the light emitting portion of the lamp L30, which is particularly conspicuous.

In short, the inventors noted that there are the cases where the efficiency of the luminous flux emitted from the light-emitting portion of the lamp L30 is reduced because the luminous flux which can be directly focused by the first concave mirror M31 is focused through reflection by the second concave mirror M32.

DISCLOSURE OF THE INVENTION

The present invention has been made in view of the problems, and an object thereof is to provide a light source apparatus, a lighting apparatus and a projection display apparatus capable of further curbing reduction in efficiency of luminous flux when during projection and so on in consideration of a size of a spot diameter of an optical spot formed.

A first aspect of the present invention is a light source apparatus comprising:

a lamp having a light emitting portion for generating light;

a first mirror having a first opening provided on a light-using side on which the generated light is used and a second opening provided on an opposite side to the light-using side, the light emitting portion being placed inside; and a second mirror having a predetermined size to reflect on the light emitting portion side the light which comes or should come out of the second opening, and placed at a predetermined position in relation to a position at which the second opening is provided, wherein the second mirror is a spherical mirror, a converging angle θ of which is substantially in the range of 50 to 90 degrees, and the size of the second opening is provided so that an amount of the used light becomes substantially maximum.

A second aspect of the present invention is the light source apparatus according to the first present invention, wherein the second mirror is a spherical mirror, a converging angle θ of which is substantially in the range of 50 to 85 degrees, and the lamp is any of a metal halide lamp and a mercury lamp.

A third aspect of the present invention is the light source apparatus according to the second present invention, wherein the first mirror is an ellipsoidal mirror or a parabolic mirror, the second mirror is a spherical mirror placed so that its center matches with a first focus of the ellipsoidal mirror or the parabolic mirror, the light emitting portion is placed to match with the first focus, and The position of the second opening is provided in proximity to a vertex on the first focus side.

A fourth aspect of the present invention is the light source apparatus according to the third present invention, wherein the second mirror is placed outside the first mirror and has a size of a predetermined value or larger to reflect the light emitted from the second opening on the light emitting portion side without missing it.

A fifth aspect of the present invention is the light source apparatus according to the third present invention, wherein the second mirror is placed to have its periphery in contact with the second opening.

A sixth aspect of the present invention is the light source apparatus according to the third present invention, wherein the first mirror and the second mirror are reflecting mirrors formed using any of glass, metal and resin.

A seventh aspect of the present invention is the light source apparatus according to the third present invention, An eighth aspect of the present invention is the light source apparatus according to the first present invention, wherein the second mirror is a spherical mirror, a converging angle θ of which is substantially in the range of 65 to 90 degrees, and the lamp is any of a xenon lamp and a halogen lamp.

A ninth aspect of the present invention is a lighting apparatus comprising:

the light source apparatus according to the first present invention; and a lens system of converting the light coming out of the first opening to approximately parallel light.

A tenth aspect of the present invention is the lighting apparatus according to the ninth present invention, wherein the lens system has lens arrays.

An eleventh aspect of the present invention is the lighting apparatus according to the tenth present invention, wherein the lens array has multiple two-dimensionally placed lenses of which openings and/or decenterings are adjusted to convert a doughnut-shaped luminous flux having a hole in the vicinity of the optical axis to a luminous flux huddling in the vicinity of the optical axis.

A twelfth aspect of the present invention is the lighting apparatus according to the ninth present invention, wherein the lens system has the lenses for converting a doughnut-shaped luminous flux having a hole in the vicinity of the optical axis to a luminous flux huddling in the vicinity of the optical axis.

A thirteenth aspect of the present invention is a projection display apparatus comprising:

the lighting apparatus according to the ninth present invention;

a light modulation element of spatially modulating the light converted to the approximately parallel light to form a predetermined optical image; and a projection lens of projecting the formed predetermined optical image.

A fourteenth aspect of the present invention is a method of using a light source comprising:

a first step of placing a light emitting portion of a lamp for generating light, inside a first mirror having a first opening provided on a light-using side on which the generated light is used and a second opening provided on an opposite side to the light-using side;

a second step of placing a second mirror having a predetermined size to reflect on the light emitting portion side the light which comes or should come out of the second opening, at a predetermined position in relation to a position at which the second opening is provided; and a third step of providing the size of the second opening so that an amount of the used light becomes substantially maximum, wherein the second mirror is a spherical mirror, a converging angle θ of which is substantially in the range of 50 to 90 degrees.

The present invention has an advantage that reduction in efficiency of the luminous flux can be further curbed during projection and so on in consideration of the size of the spot diameter of the optical spot formed.

BRIEF DESCRIPTION OF THE DRAWINGS

FIG. 9 (B) is a schematic explanatory diagram of the light source image formed on a lens array 202 on the side farther from the light source apparatus 100 according to the second embodiment of the present invention;

FIG. 9 (C) is a schematic explanatory diagram of the light source image formed on the lens array on the side farther from a conventional light source apparatus;

FIG. 14 is a schematic sectional view of a conventional light source apparatus (1);

FIG. 15 is a schematic sectional view of a conventional light source apparatus (2); and FIG. 16 is a schematic sectional view of a conventional light source apparatus (3).

DESCRIPTION OF SYMBOLS

L40 Lamp
A41 First opening
A42 Second opening
M41 First concave mirror
M42 Second concave mirror
F41 First focus
F42 Second focus
V40 Vertex

BEST MODE FOR CARRYING OUT THE INVENTION

Hereunder, embodiments of the present invention will be described with reference to the drawings.

First Embodiment

Figure 1:
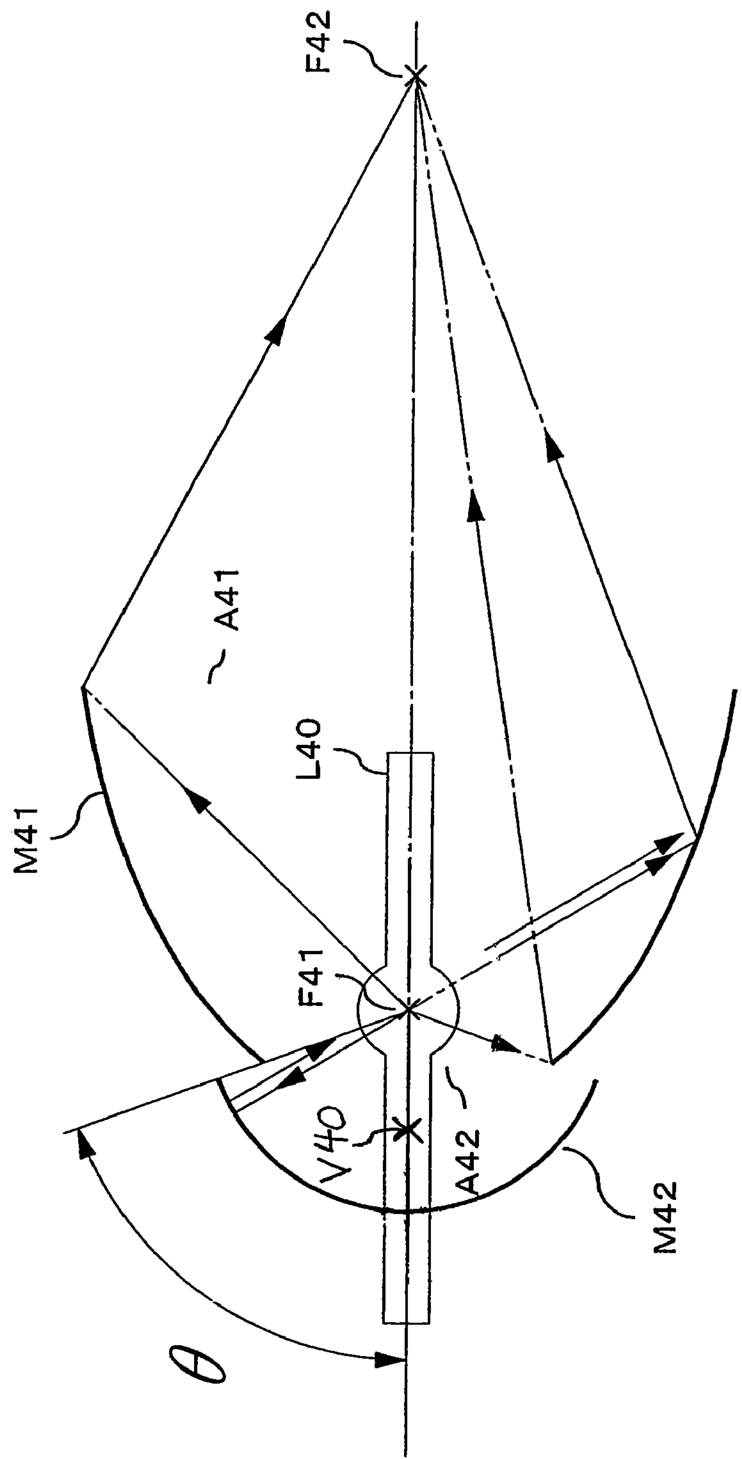
FIG. 1 is a schematic sectional view of a light source apparatus according to a first embodiment of the present invention.

First, a configuration of a light source apparatus of the present invention will be described with reference to FIG. 1 which is a schematic sectional view of the light source apparatus according to a first embodiment of the present invention.

The light source apparatus of this embodiment comprises a lamp L40 having a light emitting portion of generating light, a first concave mirror M41 having the light emitting portion of the lamp L40 placed inside, and a second concave mirror M42 placed at a predetermined position in relation to a position at which a second opening A42 is provided.

The first concave mirror M41 has a first opening A41 provided on a light-using side on which the generated light is used and the second opening A42 provided on an opposite side to the light-using side.

The second concave mirror M42 is large enough to reflect the light emitted from the second opening A42 on the light emitting portion side of the lamp L40.

The lamp L40 corresponds to the lamp of the present invention, the first concave mirror M41 corresponds to the first mirror of the present invention, and the second concave mirror M42 corresponds to the second mirror of the present invention.

As will be described in detail later, a size of the second opening A42 is provided so that an amount of light finally used via a predetermined optical system becomes substantially maximum.

Next, the configuration of the light source apparatus of this embodiment will be described further in detail.

The first concave mirror M41 is an ellipsoidal mirror rotation-symmetric as to an optical axis having a reflective layer provided to glass, and forms a reflecting mirror.

The second concave mirror M42 is a spherical mirror rotation-symmetric as to the optical axis having the reflective layer provided to the glass, placed to have its center matching with a first focus F41 of the first concave mirror M41, and forms the reflecting mirror.

A position of the second opening A42 is provided in proximity to a vertex V40 on the first focus F41 side.

The second concave mirror M42 is placed outside the first concave mirror M41, and has a size of a predetermined value or larger to reflect the light emitted from the second opening A42 on the light emitting portion side of the lamp L40 without missing it.

The second concave mirror M42 has its boundary edge as its periphery separated from the periphery of the second opening A42 (if seen from an in-and-out direction of the light, the periphery of the second concave mirror M42 is almost overlapping that of the second opening A42).

The lamp L40 is a mercury lamp of which inside of an arc tube has extra-high pressure when turned on, and is placed so that its light emitting portion matches with the first focus F41.

Next, operation of the light source apparatus of this embodiment will be described.

Of the luminous flux emitted from the light emitting portion of the lamp L40, the light reflected on the first concave mirror M41 forms an optical spot on a second focus F42 of the first concave mirror M41.

Of the light emitted from the light emitting portion of the lamp L40, the light reflected on the second concave mirror M42 is returned to the vicinity of the light emitting portion of the lamp L40 again and passes through the vicinity of the light emitting portion of the lamp L40 so as to be reflected on the first concave mirror M41 thereafter and focused on the second focus F42.

In the aforementioned conventional light source apparatus (1), the spot diameter was relatively extended as to the optical spot formed on a focusing surface by the luminous flux emitted from a light emitting portion of the lamp L10 having the size and reflected in the vicinity of the vertex V10 (refer to FIG. 14).

This is because a distance from the light emitting portion to a point of reflection is significantly shorter than the distance from the point of reflection to the focusing point as previously described.

In the case of the light source apparatus of this embodiment, however, an optical path distance from the light emitting portion to the point of reflection of the lamp L10 does not become shorter than the optical path distance from the point of reflection to the focusing point as to the luminous flux reflected on the point of reflection of the first concave mirror M41 (as the vicinity of the vertex V40 of the first concave mirror M41 becomes the second concave mirror M42, the distance to a reflecting surface of the first concave mirror M41 is extended by the amount of being reflected on the second concave mirror M42 and returning to the vicinity of the light emitting portion again).

For this reason, the spot diameter is not extended. In the case of simply placing the first concave mirror M41 and second concave mirror M42 as described above, however, there are the cases where optical usable efficiency is reduced even though the spot diameter of the formed optical spot becomes smaller.

A detail description will be given below as to a characteristic of the light source apparatus of this embodiment that the size of the second opening A42 is provided so that an amount of the used light becomes substantially maximum, with reference to FIG. 2 which is an explanatory diagram of a relation between a converging angle θ of the second concave mirror M42 and a usable amount of light according to the first embodiment of the present invention.

Figure 2:
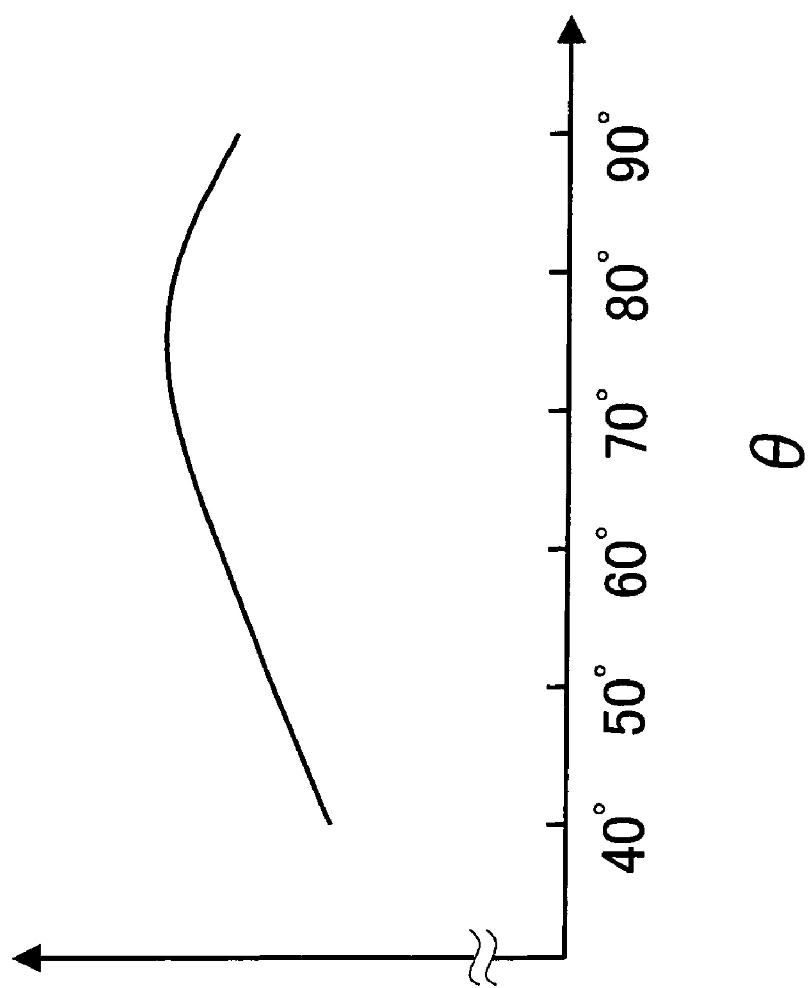
FIG. 2 is an explanatory diagram of a relation between a converging angle θ of a second concave mirror M42 and a usable amount of light according to the first embodiment of the present invention.

FIG. 2 shows the relation between the converging angle θ of the second concave mirror M42 against the optical axis and, of the luminous flux emitted from the first concave mirror M41, the amount of light focused on the second focus F42 and passing through an aperture of a predetermined size.

Of course, such an aperture of a predetermined size is the aperture of measuring the amount of light finally used via the optical system.

In the case where the converging angle θ is too large (to be more specific, the second opening A42 is too large), it means that the first second concave mirror M44 M42 is used instead of the first concave mirror M42 M41 even in an area of θ corresponding to a portion rather far from the vertex V40 capable of forming the optical spot of a spot diameter small enough to pass through the aforementioned aperture by using the first concave mirror M41.

For this reason, there arise losses such as light absorption and light scattering by a light-emitting material and a constituent material of the lamp L40, reduction in the amount of light due to a reflectance of the second concave mirror M42 and so on so that the usable amount of light is reduced.

It is apparently undesirable if the converging angle θ of the second concave mirror M42 is too small.

In the case where the converging angle θ is too small in reality (to be more specific, the second opening A42 is too small), it means that the second concave mirror M42 is not used instead of the first concave mirror M41 in the area of θ corresponding to a portion rather close to the vertex V40 incapable of forming the optical spot of the spot diameter small enough to pass through the aforementioned aperture by using the first concave mirror M41.

Of course, an optimum size of the converging angle θ (that is, the optimum size of the second concave mirror M42) varies to some extent depending on conditions such as the kind of the light-emitting material in the lamp L40, size of the light emitting portion of the lamp L40, electrode form of the lamp L40, reflectance of the second concave mirror M42, size and form of the opening of the aforementioned aperture corresponding to the edge of the rod integrator to be used in a subsequent stage, and focusing angle and a focal length of the first concave mirror M41.

Thus, it becomes necessary to perform a simulation experiment of variously changing the converging angle θ after specifying these conditions so as to provide the optimum size of the converging angle θ.

Here, such necessity will be described more specifically.

First, a description will be given as to the case of using the extra-high pressure mercury lamp as the lamp with reference to FIG. 3 which is an explanatory diagram of the relation between the converging angle θ of the second concave mirror and the usable amount of light (the case of using the extra-high pressure mercury lamp as the lamp) according to the embodiment of the present invention.

The extra-high pressure mercury lamp has relatively low light transmission of the light emitting portion. For this reason, if the second concave mirror is used in the area of θ capable of forming the optical spot of the spot diameter small enough to pass through the aforementioned aperture by using the first concave mirror, it is impossible to avoid a return light loss due to the light absorption and light scattering by the lamp so that the usable amount of light is reduced.

Figure 3:
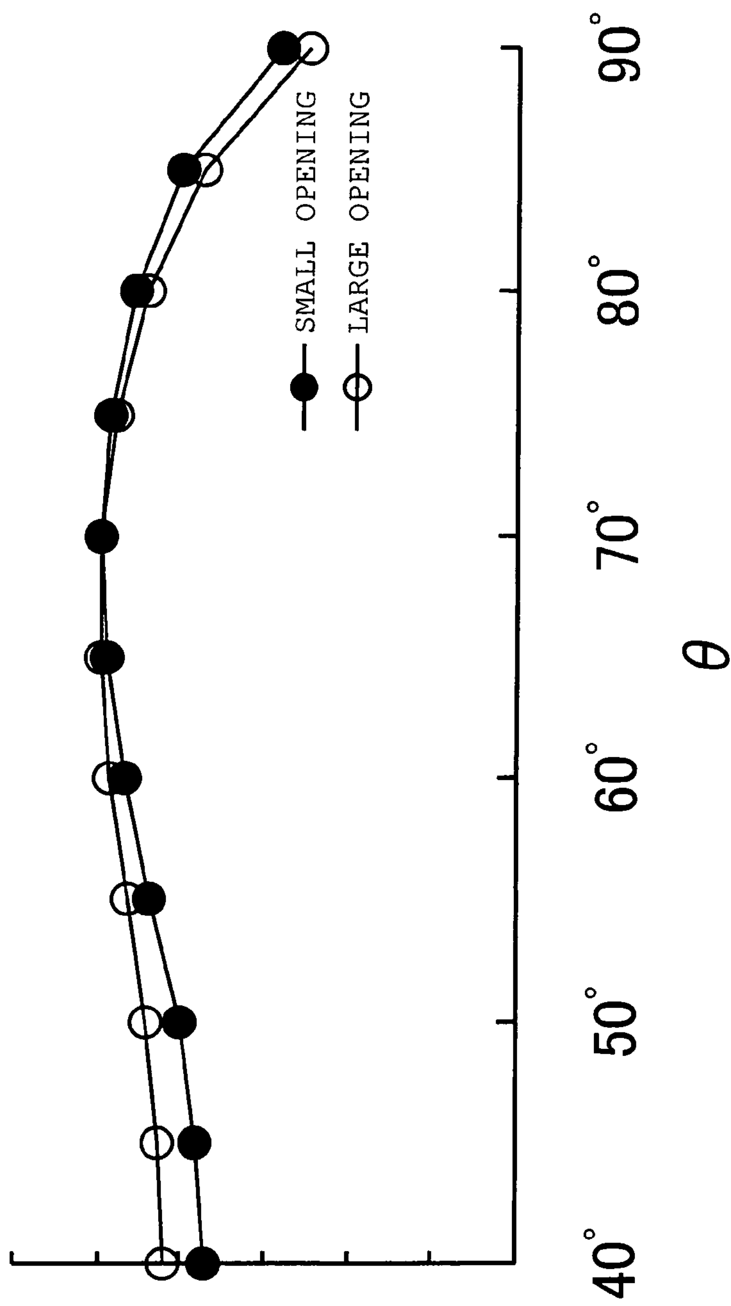
FIG. 3 is an explanatory diagram of the relation between the converging angle θ of the second concave mirror and the usable amount of light (the case of using an extra-high pressure mercury lamp as a lamp) according to the embodiment of the present invention.

Therefore, in the case of using the extra-high pressure mercury lamp as the lamp, θ at which usable amount of light becomes maximal tends to be relatively small and is about 60 to 75 degrees as shown in FIG. 3.

Such a tendency exists independently of the size of the opening of the aperture corresponding to the edge of the rod integrator to be used in a subsequent stage. However, there is a fluctuation of at least 10 degrees or so due to the aforementioned conditions, and so θ at which usable amount of light becomes maximal is often in the range of 50 to 85 degrees. FIG. 3 shows the cases where the size of the opening is small in a plot using black circles and the cases where the size of the opening is large in a plot using white circles.

Figure 4:
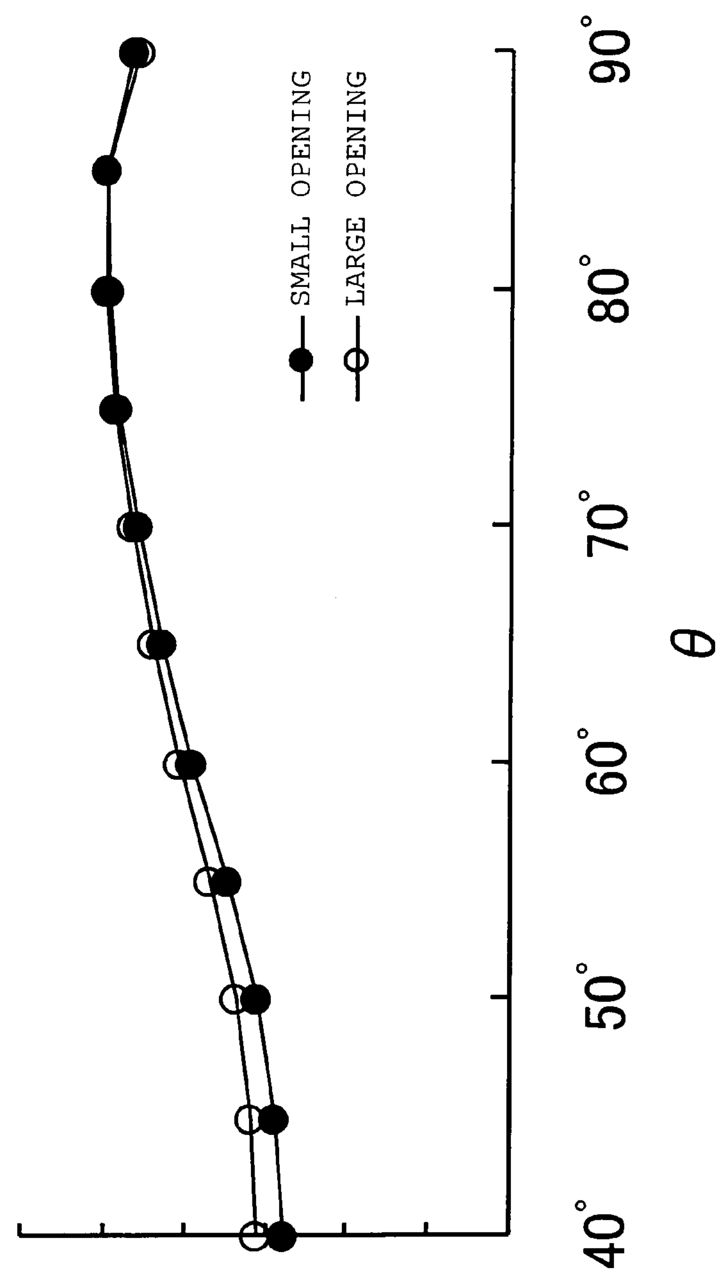
FIG. 4 is an explanatory diagram of the relation between the converging angle θ of the second concave mirror and the usable amount of light (the case of using a xenon lamp as a lamp) according to the embodiment of the present invention.

Next, a description will be given as to the case of using a xenon lamp as the lamp with reference to FIG. 4 which is an explanatory diagram of the relation between the converging angle θ of the second concave mirror and the usable amount of light (the case of using the xenon lamp as the lamp) according to the embodiment of the present invention.

The xenon lamp has relatively high light transmission of the light emitting portion. For this reason, in the case of using the xenon lamp as the lamp, unlike the case of the extra-high pressure mercury lamp, θ at which the usable amount of light becomes maximal tends to be relatively large and is about 75 to 90 degrees as shown in FIG. 4.

As in the case of using the extra-high-pressure mercury lamp as the lamp, such a tendency exists independently of the size of the opening of the aperture corresponding to the edge of the rod integrator to be used in the subsequent stage. However, there is a fluctuation of at least 10 degrees or so due to the aforementioned conditions, and so θ at which the usable amount of light becomes maximal is often in the range of 65 to 90 degrees. FIG. 4 also shows the cases where the size of the opening is small in a plot using black circles and the cases where the size of the opening is large in a plot using white circles.

After all, considering 20 degrees as an angle error, which is a difference between an angle θ=neighborhood of 70 degrees (refer to FIG. 2) capable of obtaining a maximum usable amount of light actually used in this embodiment and θ=90 degrees allowing the light reflected on the second concave mirror M42 to reach the first concave mirror M41 without fail, it is normal that the size of the optimal converging angle θ is approximately in the following range.

$$50° = 70° - 20° < \theta < 70° + 20° = 90° \quad \text{(Equation 1)}$$

Thus, according to this embodiment, it is possible to form a high-efficiency and small optical spot without upsizing of the apparatuses and increase in a parts count. For that reason, it is possible to realize the same brightness by using a lower-power lamp so as to provide the lighting apparatus and projection display apparatus of lower power consumption.

The first embodiment was described in detail above.

(A) According to the above-mentioned embodiment, the lamp of the present invention is the mercury lamp.

However, the lamp of the present invention is not limited thereto but may also be (1) the xenon lamp having the light emitting portion in a form very close to the point source and capable of high optical output, (2) a metal halide lamp excellent in luminous efficiency or (3) a low-priced halogen lamp for instance.

Although the halogen lamp is low-priced, the form of the light emitting portion thereof is rather large compared to the xenon lamp and metal halide lamp and its luminous efficiency is low. For this reason, an especially conspicuous effect is expected since the size of the second opening is provided to substantially maximize the amount of the used light as described above.

(B) According to the above-mentioned embodiment, the first mirror of the present invention is the ellipsoidal mirror.

However, the first mirror of the present invention is not limited thereto but may also be (1) a reflecting surface mirror having a quadratic surface such as a parabolic mirror or (2) a reflecting surface mirror in a form combining multiple ellipsoidal mirrors for instance.

(C) According to the above-mentioned embodiment, the second mirror of the present invention is the spherical mirror.

However, the second mirror of the present invention is not limited thereto but may also be (1) a reflecting surface mirror having a quadratic surface capable of efficiently reflecting lamp-emitted light of the ellipsoidal mirror on the proximity of the light emitting portion of the lamp or (2) a reflecting surface mirror in a form combining multiple spherical mirrors for instance.

(D) According to the above-mentioned embodiment, the second mirror of the present invention has its boundary edge as its periphery separated from the periphery of the second opening. For this reason, the form of the boundary portion of the ellipsoidal mirror portion and the spherical mirror portion is stable, and so it has an advantage that the efficiency of the light reflected on the boundary portion is improved.

Figure 5:
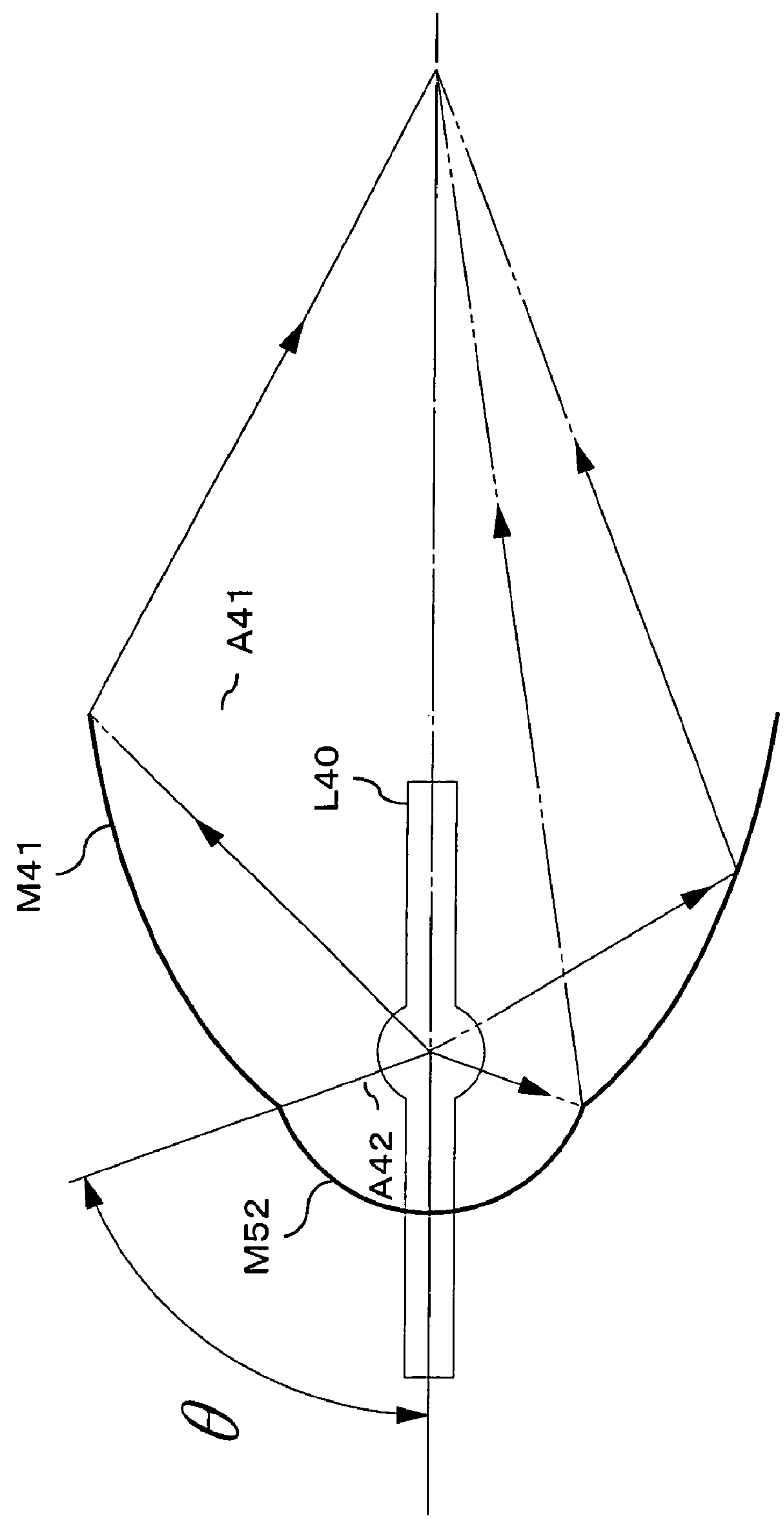
FIG. 5 is a schematic sectional view of the light source apparatus having a first concave mirror M41 and a second concave mirror M52 according to the first embodiment of the present invention.

However, the second mirror of the present invention is not limited thereto but may also have its boundary edge as its periphery matching with the periphery of the second opening as a second concave mirror M52 shown in FIG. 5 which is a schematic sectional view of the light source apparatus having the first concave mirror M41 and second concave mirror M52 according to the embodiment of the present invention. In the case of adopting such an all-in-one configuration, it is possible to handle the two mirrors as one molded piece, and so there is an advantage that the parts count decreases and no adjustment is necessary.

(E) According to the above-mentioned embodiment, the first and second mirrors of the present invention are the reflecting mirrors formed using glass.

However, the first and second mirrors of the present invention are not limited thereto but may also be the reflecting mirrors formed using a metal or a resin.

In the case where the first and second mirrors of the present invention are formed using glass or a resin, the light absorption is small and so there is an advantage that cooling capacity of a cooling apparatus (not shown) can be small.

(F) According to the above-mentioned embodiment, the first and second mirrors of the present invention are rotation-symmetric as to the optical axis.

Figure 6:
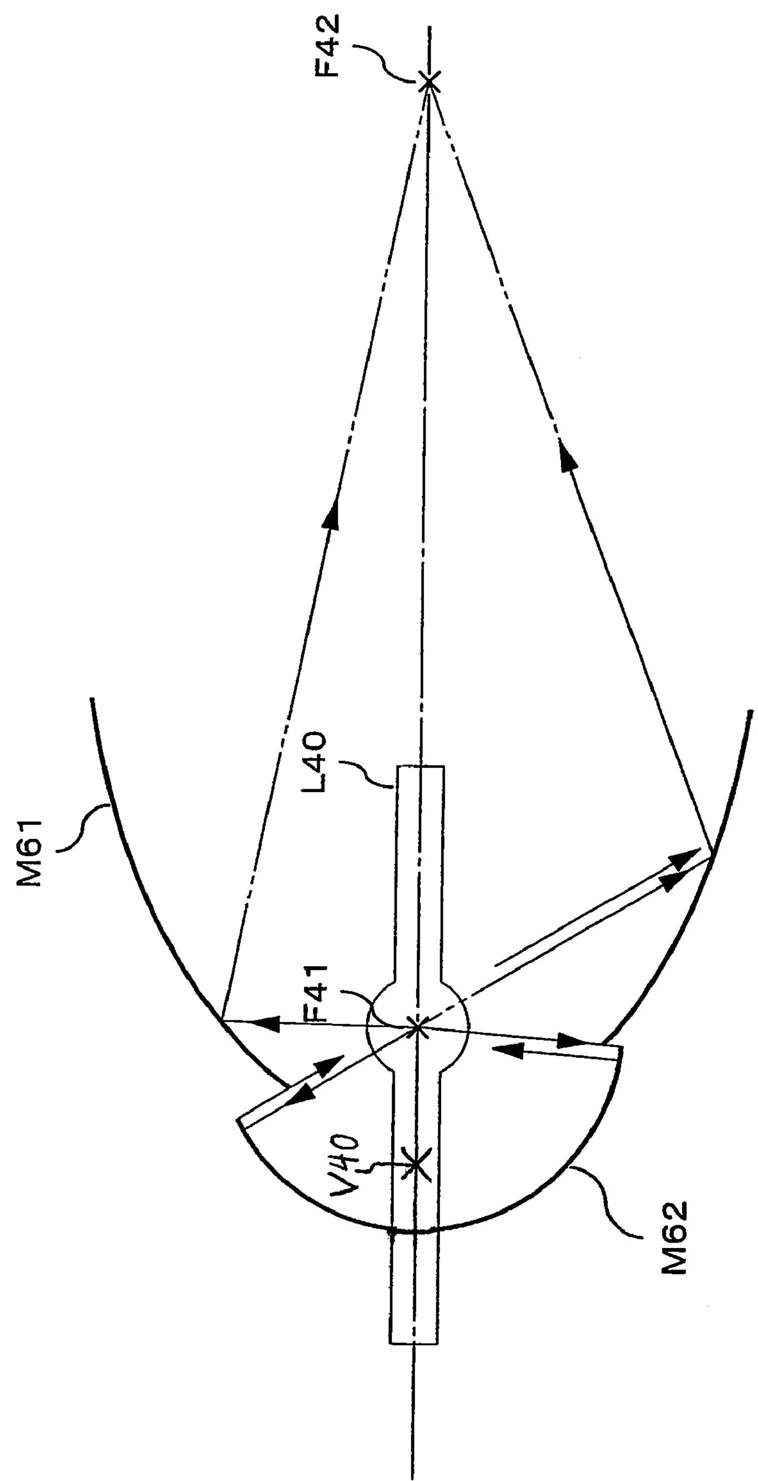
FIG. 6 is a schematic sectional view of the light source apparatus having a first concave mirror M61 and a second concave mirror M62 according to the first embodiment of the present invention.

However, the first and second mirrors of the present invention are not limited thereto but may also be non-rotation-symmetric as to the optical axis as a first concave mirror M61 and a second concave mirror M62 shown in FIG. 6 which is a schematic sectional view of the light source apparatus having the first concave mirror M61 and second concave mirror M62 according to the embodiment of the present invention.

(G) According to the above-mentioned embodiment, the second mirror of the present invention is placed outside the first mirror.

Figure 7:
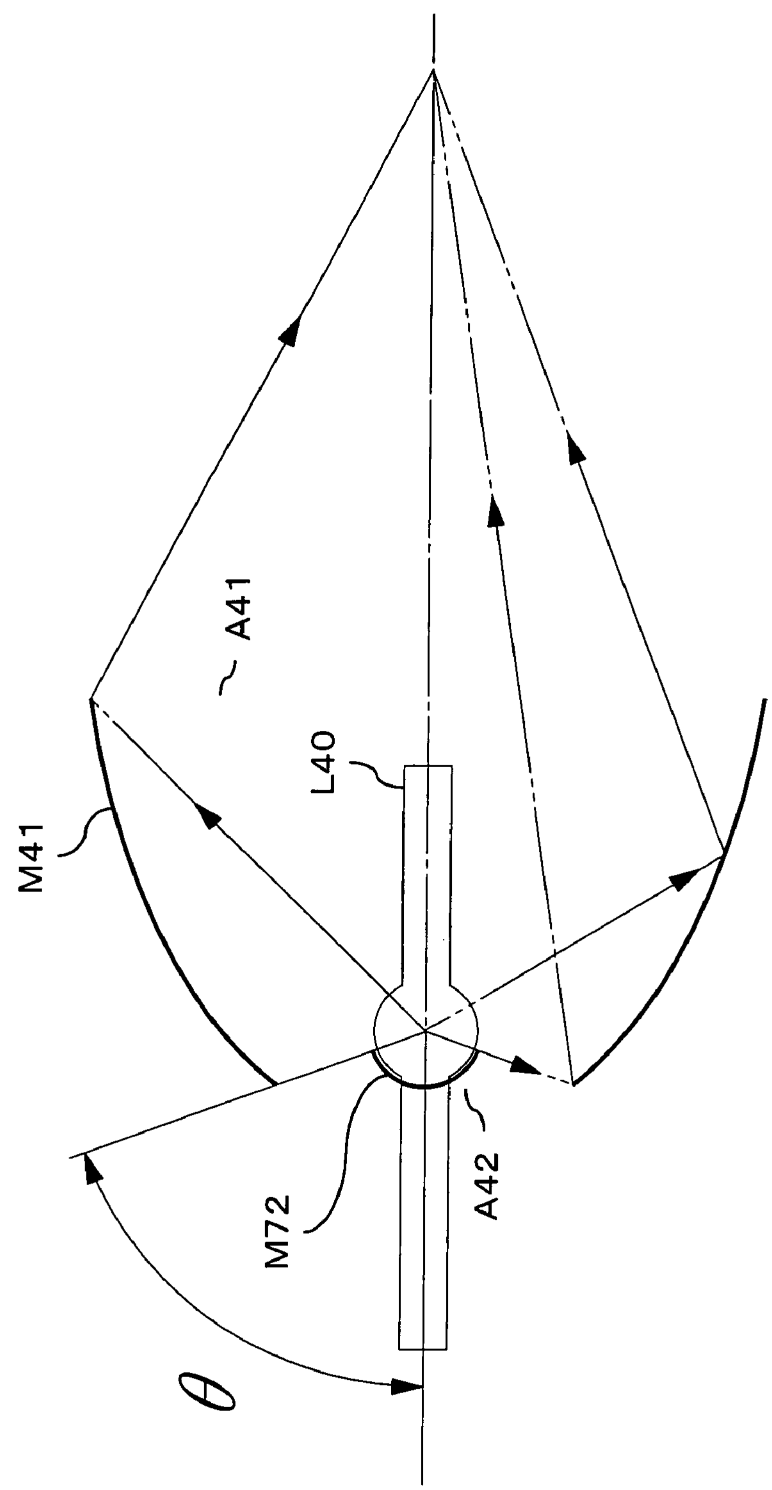
FIG. 7 is a schematic sectional view of the light source apparatus having a first concave mirror M41 and a second concave mirror M72 according to the first embodiment of the present invention.

However, the second mirror of the present invention is not limited thereto but may also be placed inside the first concave mirror M41 as a second concave mirror M72 shown in FIG. 7 which is a schematic sectional view of the light source apparatus having the first concave mirror M41 and second concave mirror M72 according to the embodiment of the present invention.

Such a light source apparatus (refer to FIG. 7) comprises a lamp L40 having a light emitting portion of generating light, the first concave mirror M41 having the light emitting portion of the lamp L40 placed inside, and the second concave mirror M72 placed at a predetermined position in relation to the position at which the second opening A42 is provided, where the size of the second opening A42 is provided to substantially maximize the amount of the used light.

The first concave mirror M41 has the first opening A41 provided on the side of emitting the generated light after being reflected on the first concave mirror M41 (or on the light-using side on which the generated light is used) and the second opening A42 provided on the opposite side to the light-using side.

The second concave mirror M72 is large enough to reflect the light which is emitted to the second opening A42 side and cannot be focused on the first concave mirror M41 (or should come out of the second opening A42) onto the light emitting portion side.

A vessel containing the light emitting portion of the lamp L40 approximately at its center is in a spherical form in many cases. Therefore, it is also possible to configure the second concave mirror M72 with reflection coating formed on the surface of the vessel. It becomes no linger necessary, by using such a configuration, to take the trouble to provide the second concave mirror M72 as a separate component. Thus, the parts count can be reduced.

Second Embodiment

Figure 8:
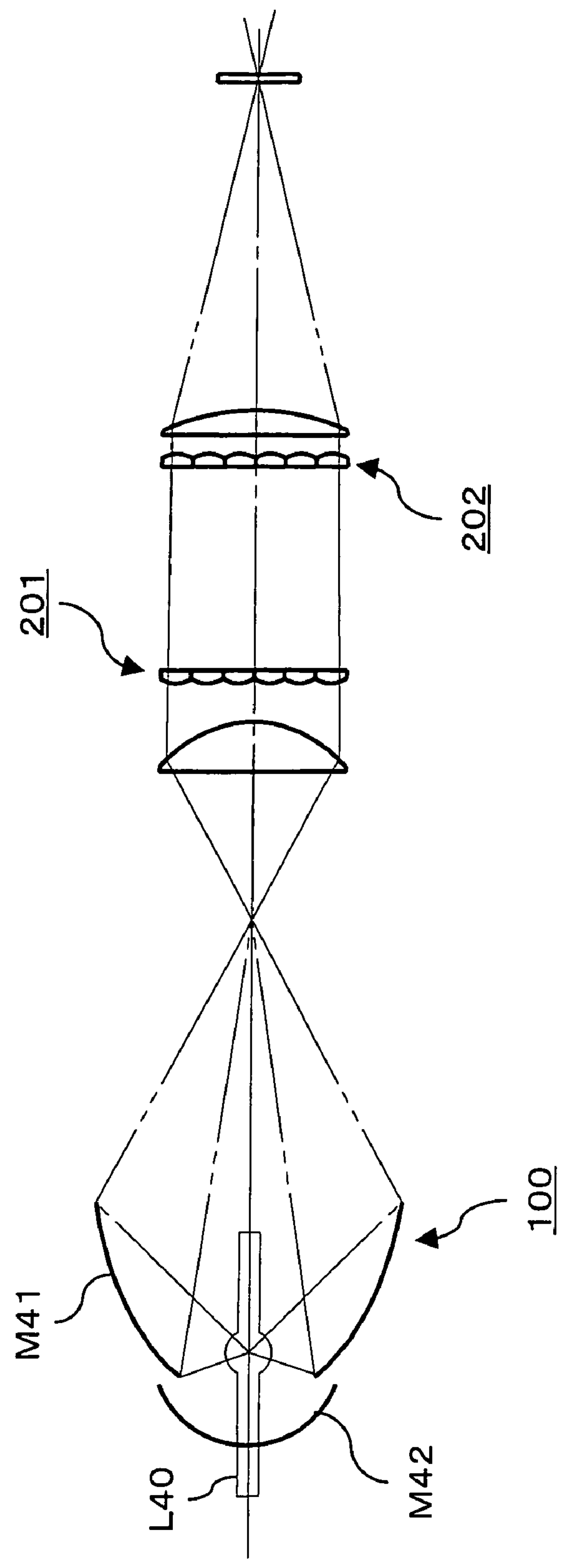
FIG. 8 is a schematic sectional view of a lighting apparatus according to a second embodiment of the present invention.

First, the configuration of the lighting apparatus of this embodiment will be described with reference to FIG. 8 which is a schematic sectional view of the lighting apparatus according to a second embodiment of the present invention.

The lighting apparatus of this embodiment comprises a light source apparatus 100 having the same configuration as the above-mentioned first embodiment and lens arrays 201, 202 of converting the light coming out of the first opening A41 (refer to FIG. 1) to approximately parallel light.

Means including the lens arrays 201, 202 is corresponding to a lens system of the present invention.

As will be described in detail later, the lens arrays 201, 202 have multiple two-dimensionally placed lenses of which openings and decenterings are adjusted to convert doughnut-shaped luminous flux having a hole in the vicinity of the optical axis to the luminous flux huddling in the vicinity of the optical axis.

Next, the operation of the lighting apparatus of this embodiment will be described.

The lighting apparatus of this embodiment uses the light source apparatus 100 having the same configuration as the above-mentioned first embodiment so as to generate the optical spots of a small diameter with high efficiency.

According to this embodiment, however, the second concave mirror M42 is used in order to reflect the light coming out of the second opening A42 (refer to FIG. 1) on the light emitting portion side of the lamp L40. Therefore, less light is focused at a small angle relative to the optical axis and more light is focused at a large angle.

Figure 9C:
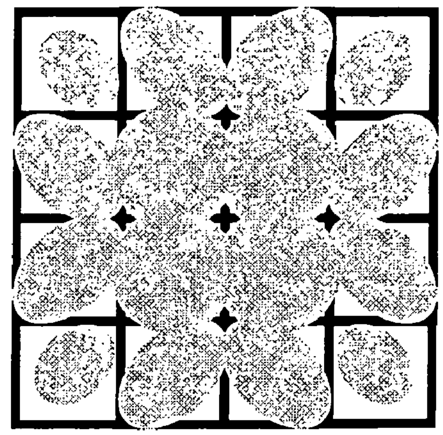
FIG. 9 (A) is a schematic explanatory diagram of a light source image formed on a lens array 201 on a side close to a light source apparatus 100 according to the second embodiment of the present invention.
Figure 9B:
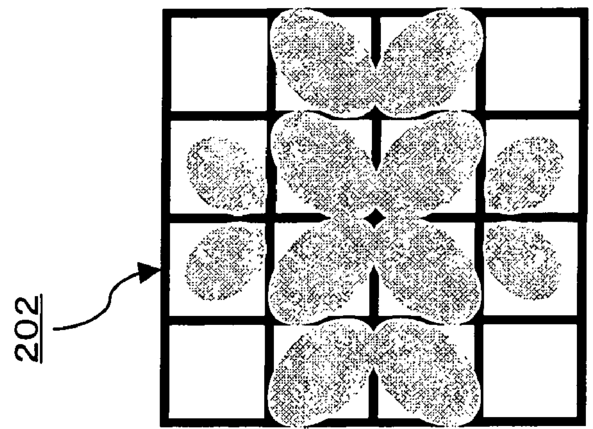
Figure 9A:
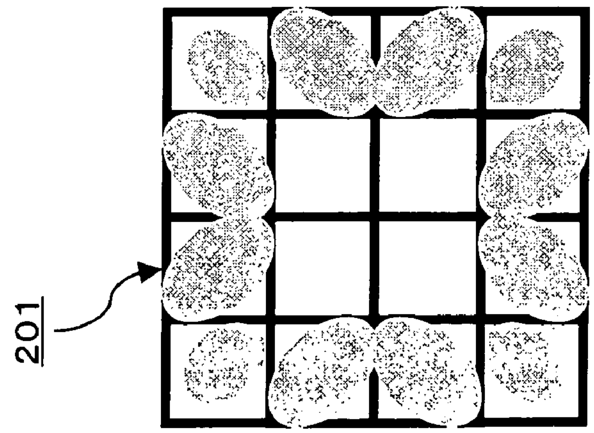

To be more precise, the lens array 201 has a light source image (doughnut-shaped light source image) formed thereon as the one shown in FIG. 9 (A) which is a schematic explanatory diagram of the light source image formed on the lens array 201 on the side closer to the light source apparatus 100 according to the second embodiment of the present invention.

According to this embodiment, as for the lens array 202 placed on the side farther from the light source apparatus 100, the lenses are adjusted by eliminating the lenses in the vicinity of the optical axis and extending the openings of the lenses in the periphery in order to obtain the lens array of approximately the same size as before as a whole (of course, it is possible to rearrange the lenses to have smaller diameters and obtain a smaller lens array than before as a whole so as to render the size of the optical system smaller).

In the lens array 201 placed on the side closer to the light source apparatus 100, adjustments of the lenses are made to decenter them so as to have the light source image in the periphery pass the corresponding lens at the center of the lens array 202.

For this reason, the lens array 202 has the light source image formed thereon as the one shown in FIG. 9 (B) which is a schematic explanatory diagram of the light source image formed on the lens array 202 on the side farther from the light source apparatus 100 according to the second embodiment of the present invention.

If the light emitted from the light source apparatus is focused on the second focus of the ellipsoidal mirror, it often happens that the amount of light of the luminous flux of a large incident angle increases and the amount of light incident at a small angle decreases extremely. Thus, the lens arrays should have the multiple two-dimensionally placed lenses of which openings and/or decenterings are adjusted to convert the doughnut-shaped luminous flux having a hole in the vicinity of the optical axis to the luminous flux huddling in the vicinity of the optical axis as described above. And then, a conspicuous effect is expected in the optical system having optical means such as the mirrors and obstacles in the vicinity of the optical axis in particular.

Thus, it is possible to significantly improve the optical usable efficiency of the lighting apparatus of this embodiment.

If the single concave mirror M11 (refer to FIG. 14) is used instead of the first concave mirror M41 and second concave mirror M42, the light approximately parallel to the light incident on the lens array placed on the side closer to the light source apparatus forms such a light source image as shown in FIG. 9 (C) which is a schematic explanatory diagram of the light source image formed on the lens array on the side farther from the conventional light source apparatus.

In the case of using the light source apparatus having a single ellipsoidal mirror, the light source image in the vicinity of the optical axis becomes larger and the light source image on a peripheral side becomes smaller on the lens array placed on the side farther from the light source apparatus.

A major cause thereof is that the luminous flux reflected in the vicinity of the vertex of the ellipsoidal mirror mainly gets incident on the lenses in the vicinity of the optical axis.

Of course, the light source image sticking out of the lens is not focused on the area to be lighted.

Thus, this embodiment improves the optical usable efficiency as the lighting apparatus by forming the light source images of the sizes as close as possible to the openings of the lenses.

Thus, according to this embodiment, it is possible to form the high-efficiency and small optical spot without upsizing of the apparatuses and increase in the parts count. For that reason, it is possible to realize the same brightness by using a lower-power lamp so as to provide the projection display apparatus of lower power consumption.

The second embodiment was described in detail above.

(A) According to the above-mentioned embodiment, the lens system of the present invention comprises the lens array.

Figure 10:
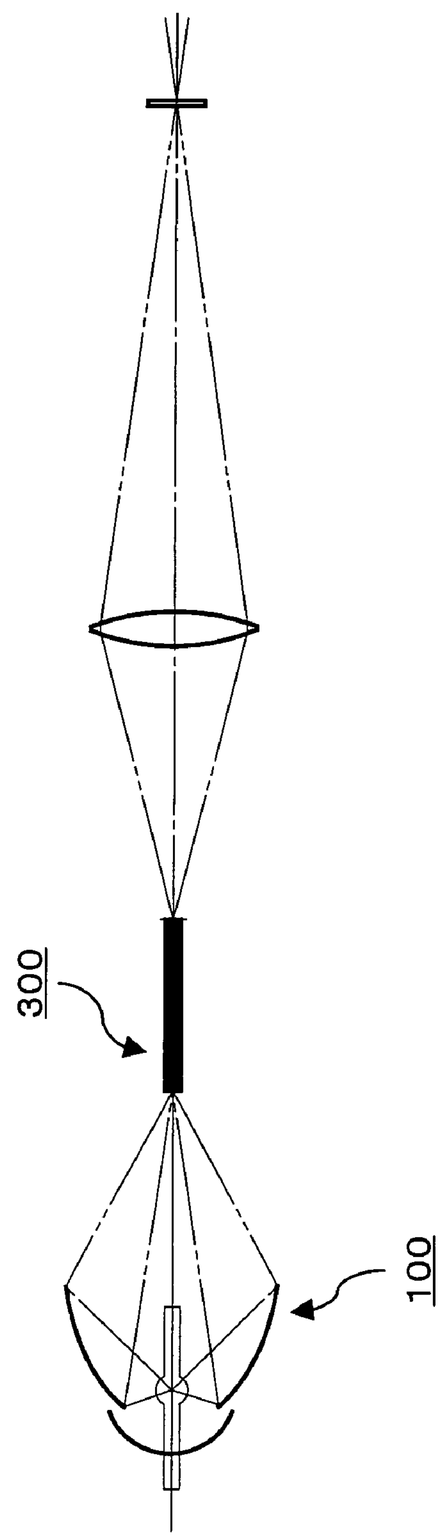
FIG. 10 is a schematic sectional view of the lighting apparatus having a rod integrator 300 according to the embodiment of the present invention.
Figure 11:
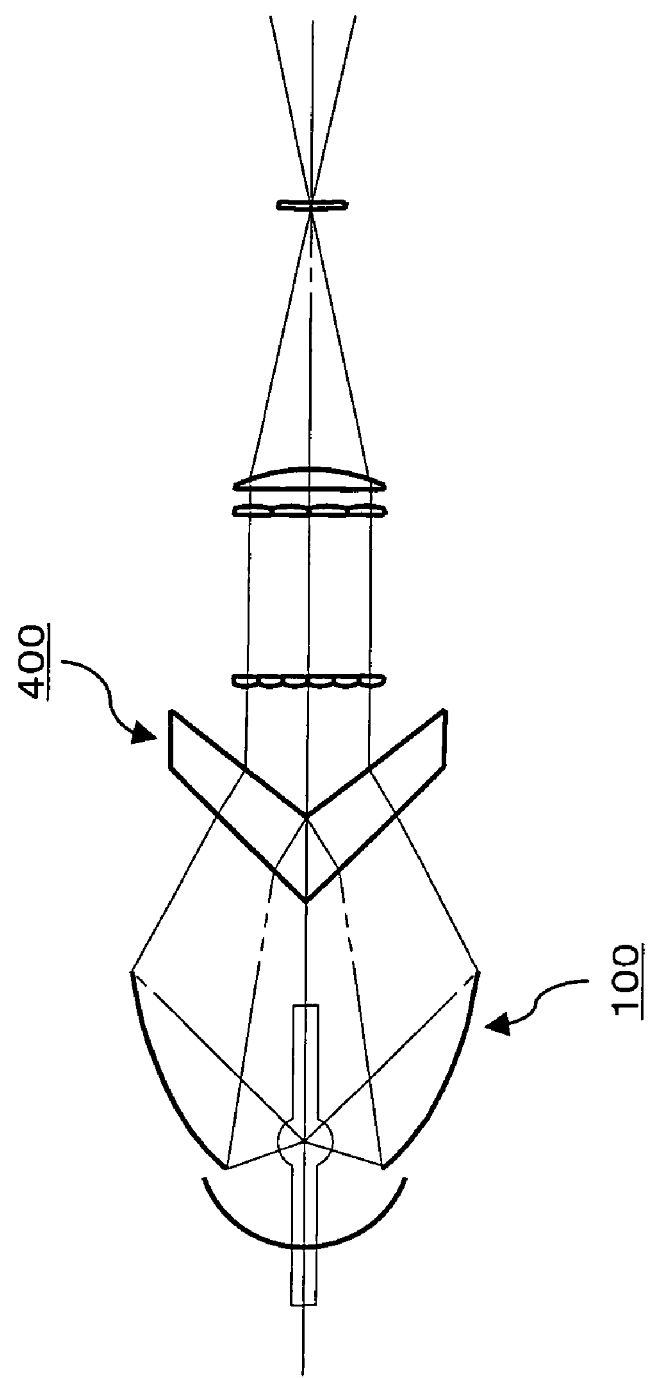
FIG. 11 is a schematic sectional view of the lighting apparatus having a lens 400 according to the embodiment of the present invention.

However, the lens system of the present invention is not limited thereto but may also comprise (1) a rod integrator 300 having a glass column and the mirror glued together shown in FIG. 10 which is a schematic sectional view of the lighting apparatus having the rod integrator 300 according to the embodiment of the present invention or (2) the optical means such as a lens 400 of converting the emitted doughnut-shaped luminous flux to predetermined approximately parallel light shown in FIG. 11 which is a schematic sectional view of the lighting apparatus having the lens 400 according to the embodiment of the present invention.

In the case where the lens system of the present invention has the lens such as the lens 400 shown in FIG. 11, there is an advantage that the size of the optical system can be rendered smaller.

(B) The projection display apparatus of the present invention comprises the lighting apparatus of the above-mentioned embodiment, a light modulation element of spatially modulating the light converted to the approximately parallel light to form a predetermined optical image, and a projection lens of projecting the predetermined optical image formed.

Figure 12:
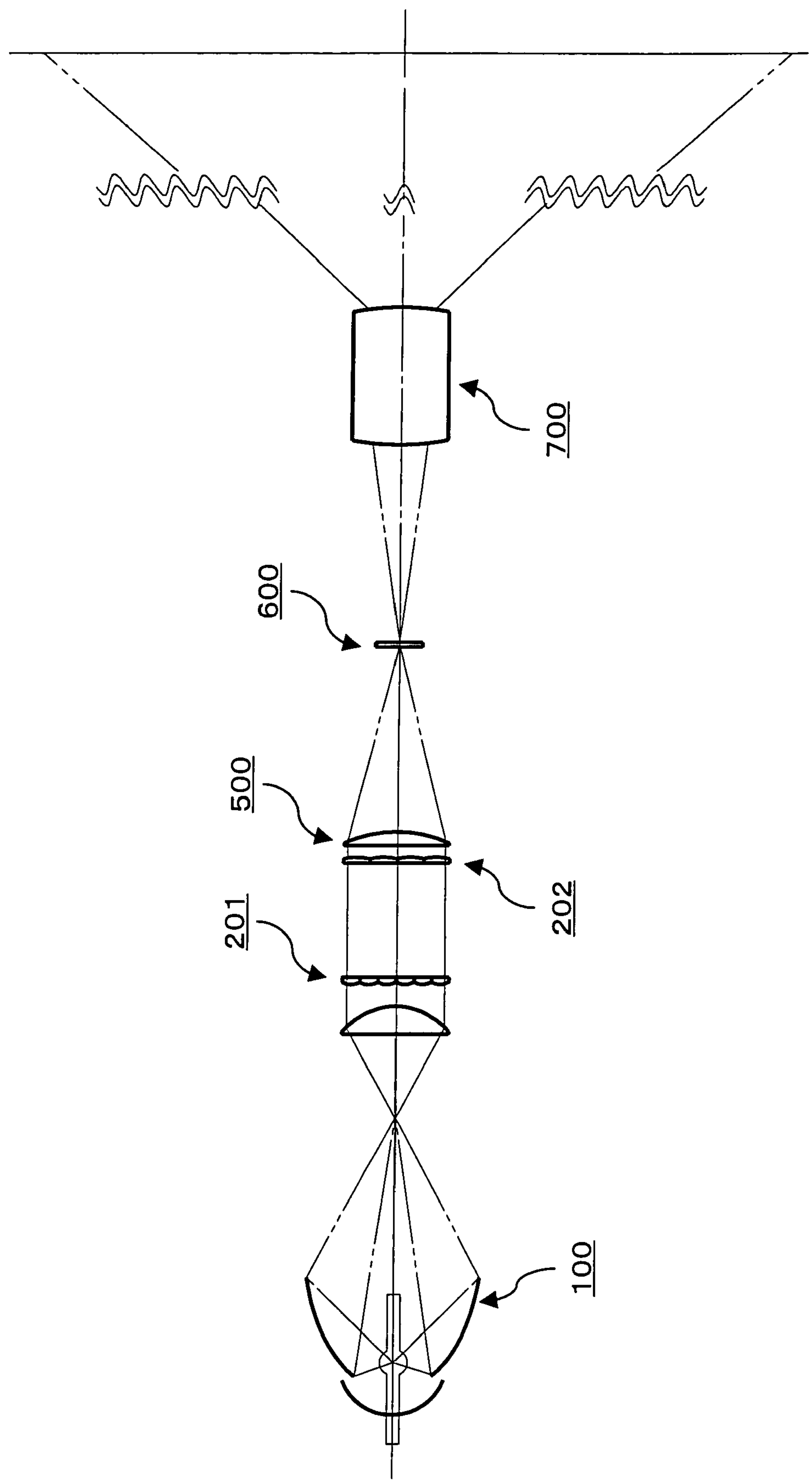
FIG. 12 is a schematic sectional view of a projection display apparatus having a field lens 500, a light modulation element 600 and a projection lens 700 according to the embodiment of the present invention.

To be more precise, the projection display apparatus of the present invention is realized, for instance, as the apparatus comprising the light source apparatus 100, the lens arrays 201, 202, a field lens 500, a light modulation element 600 and a projection lens 700 as shown in FIG. 12 which is a schematic sectional view of the projection display apparatus having the field lens 500, light modulation element 600 and projection lens 700 according to the embodiment of the present invention.

Figure 13:
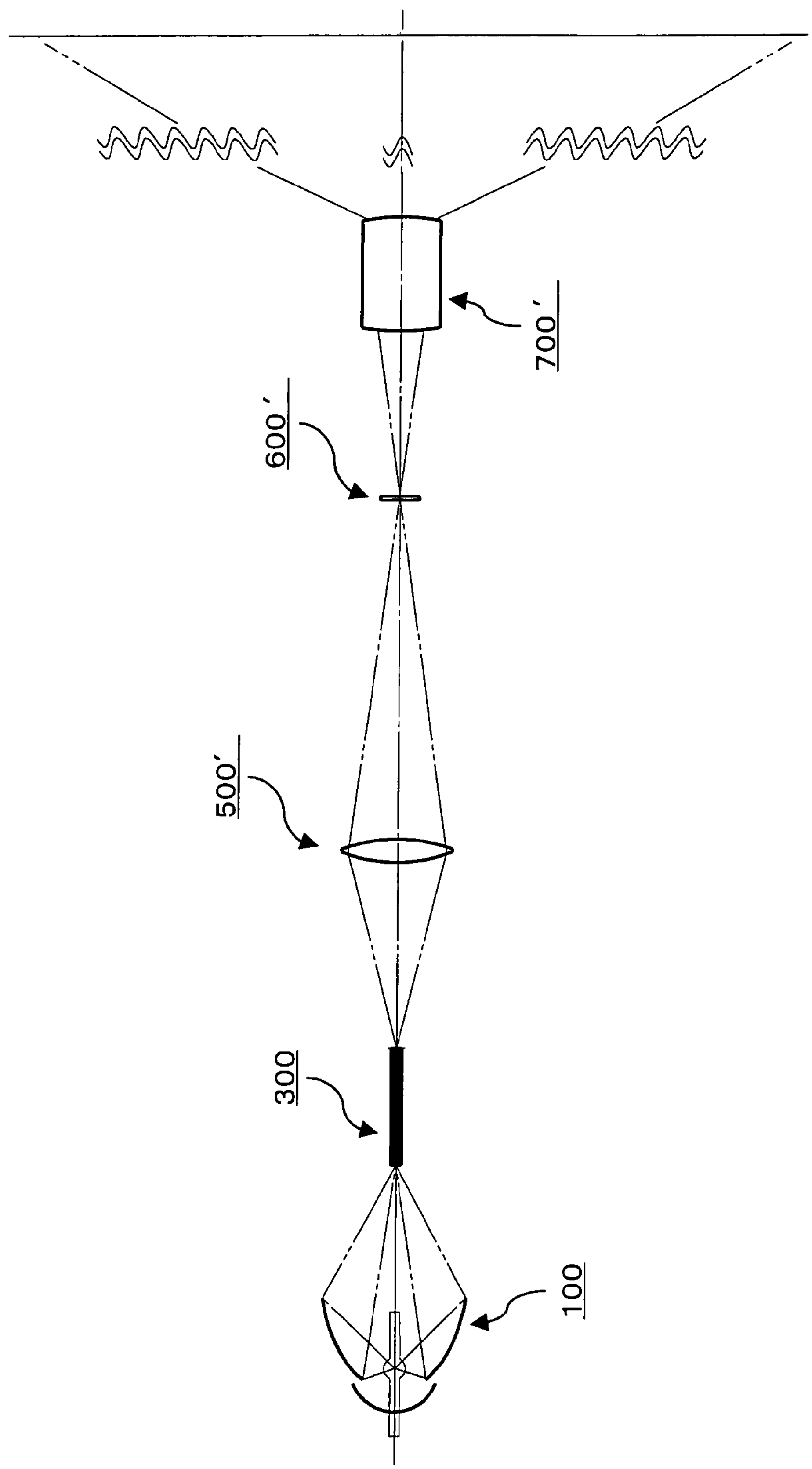
FIG. 13 is a schematic sectional view of a projection display apparatus having a field lens 500', a light modulation element 600' and a projection lens 700' according to the embodiment of the present invention.

The projection display apparatus of the present invention is also realized, for instance, as the apparatus comprising the light source apparatus 100, the rod integrator 300, a field lens 500', a light modulation element 600' and a projection lens 700' as shown in FIG. 13 which is a schematic sectional view of the projection display apparatus having a field lens 500', a light modulation element 600' and a projection lens 700' according to the embodiment of the present invention.

To be more precise, the light modulation element of the present invention is one or a plurality of (1) reflective light valves, (2) transparent light valves, (3) mirror panels capable of changing a direction of reflection with minute mirrors placed like an array, and (4) light modulation means such as an optical writing method.

Of course, such an optical system may include optical components other than the lenses as optical means of performing conversion to illuminating light, such as an optical component combining a mirror, a prism and a plurality of lenses.

Such an optical system may also include the prisms, filters, mirrors and so on capable of color separation and color composition.

The light source apparatus, lighting apparatus and projection display apparatus according to the present invention have an advantage of being able to further curb the reduction in the efficiency of the luminous flux when during projection and so on in consideration of the size of the spot diameter of the optical spot formed.

The invention claimed is:

1. A light source apparatus comprising:

a lamp having a light emitting portion for generating light, the light emitting portion having a predetermined size;

a first mirror, which is an ellipsoidal mirror with a first focus, a second focus, and an optical axis passing through the first focus and the second focus, having a first opening and a second opening, the first opening intersecting the optical axis at a point between the first focus and the second focus, the second opening intersecting the optical axis at a point between the first focus and a vertex of the first mirror that is nearer to the first focus, the light emitting portion being placed at the first focus, the first mirror being oriented to reflect the generated light so that the reflected light passes through the first opening and focuses on the second focus; and a second mirror having a size of a predetermined value or larger to substantially reflect all of a portion of the generated light transmitted out of the second opening to the first focus, wherein the second mirror is a spherical mirror, a center of which is placed at the first focus of the first mirror, and the size of the second opening is provided so that a sum of (i) a loss occurring due to the fact that a part of the light reflected by the first mirror fails to pass through a predetermined aperture placed at the second focus, because of the predetermined size of the light emitting portion, and (ii) a loss occurring when the light is reflected by the second mirror and passes through the light emitting portion, because of a predetermined reflectance of the second mirror and a predetermined transmittance of the light emitting portion, becomes substantially minimum.

2. The light source apparatus according to claim 1, wherein a converging angle θ from an edge of the second mirror to the center relative to the optical axis being calculated, the converging angle θ is in the range of 50 to 85 degrees, and the lamp is any of a metal halide lamp and a mercury lamp.

3. The light source apparatus according to claim 2, wherein the predetermined position of the second opening is determined in proximity to the vertex of the first mirror provided along the optical axis.

4. The light source apparatus according to claim 3, wherein the second mirror is placed outside the first mirror.

5. The light source apparatus according to claim 3, wherein the second mirror is placed such that the edge is in contact with the second opening.

6. The light source apparatus according to claim 3, wherein the first mirror and the second mirror are reflecting mirrors formed using any of glass, metal and resin.

7. The light source apparatus according to claim 3, wherein the lamp has a vessel having the light emitting portion placed substantially at its center, and the second mirror is reflection coating formed using a surface of the vessel.

8. The light source apparatus according to claim 1, wherein a converging angle θ from an edge of the second mirror to the center relative to the optical axis being calculated, the converging angle θ is in the range of 65 to 90 degrees, and the lamp is any of a xenon lamp and a halogen lamp.

9. A lighting apparatus comprising:

the light source apparatus according to claim 1; and a lens system for converting the reflected light from the first opening to approximately parallel light.

10. The lighting apparatus according to claim 9, wherein the lens system includes a lens array.

11. The lighting apparatus according to claim 10, wherein the lens array has multiple two-dimensionally placed lenses of which openings and/or decenterings are adjusted to convert a doughnut-shaped luminous flux having a hole in the vicinity of the optical axis to a luminous flux huddling in the vicinity of the optical axis.

12. The lighting apparatus according to claim 9, wherein the lens system has lenses for converting a doughnut-shaped luminous flux having a hole in the vicinity of the optical axis to a luminous flux huddling in the vicinity of the optical axis.

13. A projection display apparatus comprising:

the lighting apparatus according to claim 9;

a light modulation element for spatially modulating the light converted to the approximately parallel light to form a predetermined optical image; and a projection lens for projecting the formed predetermined optical image.

14. A method of using a light source comprising:

a first step of placing a light emitting portion of a lamp for generating light at a first focus of a first mirror, which is an ellipsoidal mirror with the first focus, a second focus, and an optical axis passing through the first focus and the second focus, the light emitting portion having a predetermined size, the first mirror having a first opening and a second opening, the first opening intersecting the optical axis at a point between the first focus and the second focus, the second opening intersecting the optical axis at a point between the first focus and a vertex of the first mirror that is nearer to the first focus, the first mirror oriented to reflect the generated light so that the reflected light passes through the first opening and focuses on the second focus;

a second step of placing a second mirror having a size of a predetermined value or larger to substantially reflect all of a portion of the generated light transmitted out of the second opening to the first focus; and a third step of providing the size of the second opening so that a sum of (i) a loss occurring due to the fact that a part of the light reflected by the first mirror fails to pass through a predetermined aperture placed at the second focus, because of the predetermined size of the light emitting portion, and (ii) a loss occurring when the light is reflected by the second mirror and passes through the light emitting portion, because of a predetermined reflectance of the second mirror and a predetermined transmittance of the light emitting portion, becomes substantially minimum, wherein the second mirror is a spherical mirror, a center of which is placed at the first focus of the first mirror.

15. A light source apparatus comprising:

a lamp having a light emitting portion for generating light, the light emitting portion having a predetermined size;

a first mirror, which is an ellipsoidal mirror with a first focus, a second focus, and an optical axis passing through the first focus and the second focus, having a first opening and a second opening, the first opening intersecting the optical axis at a point between the first focus and the second focus, the second opening intersecting the optical axis at a point between the first focus and a vertex of the first mirror that is nearer to the first focus, the light emitting portion being placed at the first focus, the first mirror being oriented to reflect the generated light so that the reflected light passes through the first opening and focuses on the second focus; and a second mirror having a size of a predetermined value or larger to substantially reflect all of a portion of the generated light transmitted out of the second opening to the first focus, wherein the second mirror is a spherical mirror, a center of which is placed at the first focus of the first mirror, a converging angle θ from an edge of the second mirror to the center relative to the optical axis being calculated, the converging angle θ is in the range of 65 to 90 degrees if the lamp is a xenon lamp or the converging angle θ is in the range of 50 to 85 degrees if the lamp is a metal halide lamp, and the size of the second opening is provided so that a sum of (i) a loss occurring due to the fact that a part of the light reflected by the first mirror fails to pass through a predetermined aperture placed at the second focus, because of the predetermined size of the light emitting portion, and (ii) a loss occurring when the light is reflected by the second mirror and passes through the light emitting portion, because of a predetermined reflectance of the second mirror and a predetermined transmittance of the light emitting portion, becomes substantially minimum.

* * * * *